United States Patent Office 3,258,968
Patented July 5, 1966

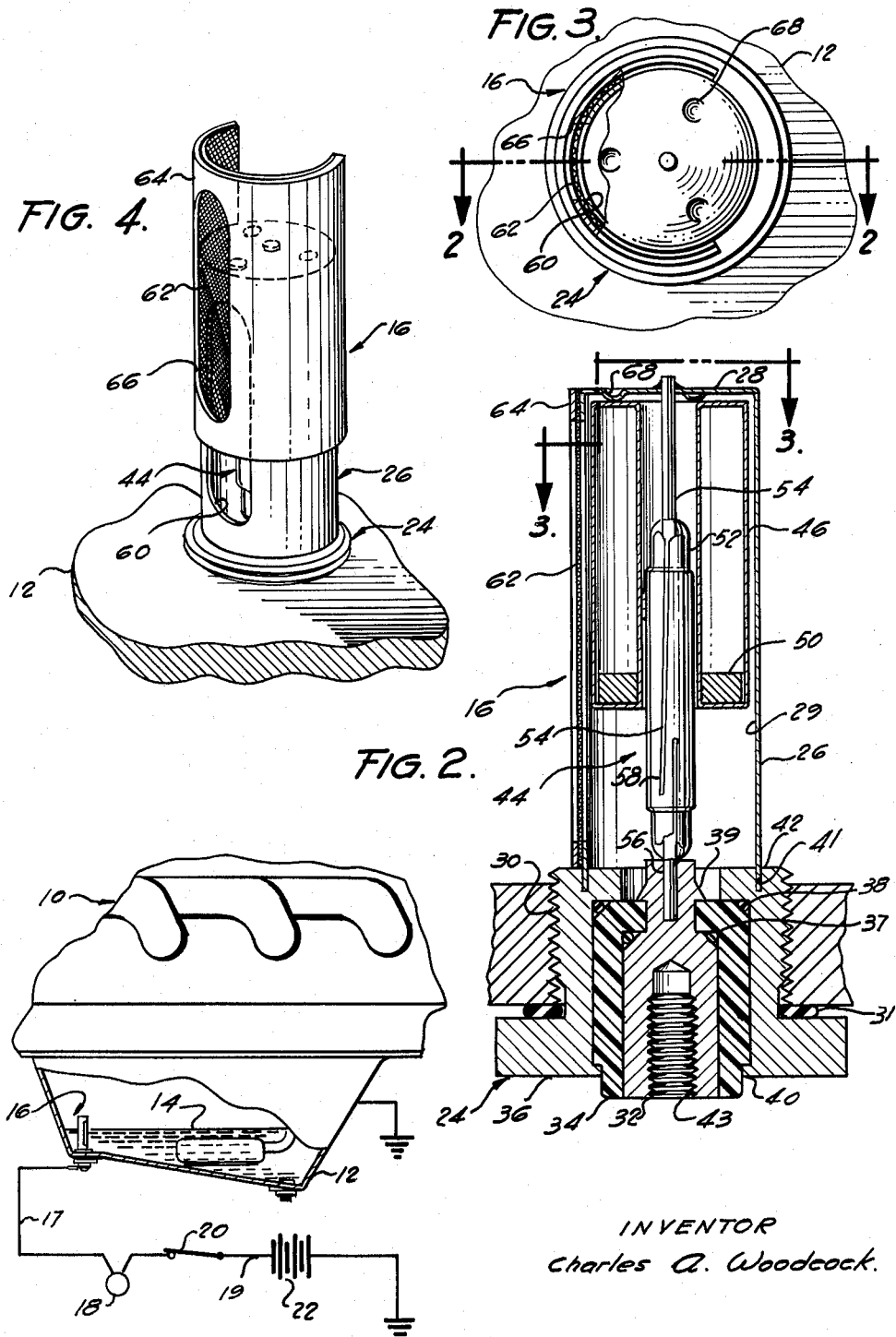

3,258,968
LIQUID LEVEL INDICATING DEVICE
Charles A. Woodcock, Springfield, Ill., assignor to Stewart-Warner Corporation, Chicago, Ill., a corporation of Virginia
Filed Oct. 2, 1963, Ser. No. 313,313
2 Claims. (Cl. 73—308)

This invention relates to a liquid level indicating device, and more particularly, to such a device including a magnetic switch, a float buoyed by the liquid, and a magnet supported by the float proximate the switch operable at various levels relative to the switch to actuate the switch to complete an appropriate electric control circuit.

Liquid level indicating devices are commonly used to measure the depth of liquid in a vessel or container. Typical devices of this type include an electric control switch and a float buoyed by the liquid and which through appropriate linkage actuates the switch. However, devices of this type are large and bulky, and quite expensive to fabricate. Furthermore, since the moving components, such as the float or actuating linkage, commonly define the exterior of the device, the device can become inoperative or out of adjustment by and upon clogging from impurities in the liquid, wild surging of the liquid, or entanglement with adjacent structure.

Accordingly, an object of this invention is to provide a liquid level indicating device that has all of its moving components enclosed within a case and generally separated from the liquid to be measured so that impurities in or surging of the liquid has no effect on the dependability or operation of the device.

Another object of this invention is to provide a liquid level indicating device that is economical to fabricate while yet having wide versatility in application.

In order that these and other objects can be more fully appreciated reference is herein made to the accompanying drawing, wherein:

FIG. 1 is a side elevational view of the subject control device, as shown in an internal combustion engine, and further showing a schematic of a typical electric control circuit;

FIG. 2 is an enlarged section view taken generally through the center of the device of FIG. 1;

FIG. 3 is a top plan view, partially shown in section as seen from line 3—3 of FIG. 2; and FIG. 4 is a perspective view of the device shown in FIGS. 1–3, with the components thereof being adjusted differently and partially disassembled.

FIG. 1 shows a liquid container or vessel in which the subject liquid level indicating device has typical application. Thus an internal combustion engine 10 has an oil pan 12 adapted to be filled with oil up to an acceptable oil level, generally indicated at 14. It is generally recognized that a slight variation from the oil level 14 can be tolerated, while any large variation can cause damage to the engine. Accordingly, a liquid level indicating device 16 is supported within the oil and actuated upon the oil level dropping from the level 14 any damaging amount. The device 16 typically is connected by conductor 17 to an indicating means 18 such as a gauge, lamp, buzzer or the like, and through conductor 19 and ignition switch 20 to a battery 22. In the device as shown the oil pan 12 is grounded so that a control circuit is completed from the power source 22 through the device 16 to the grounded oil pan 12.

Referring now to FIGS. 2, 3 and 4, a preferred embodiment of the subject liquid level indicating device 16 is shown. The device 16 includes a base 24 having secured thereto a cylindrical tube or cover 26 closed at the end 28 to form therein an elongated cavity 29. The base 24 is threaded externally at 30 for providing ready mechanical connection to an appropriate threaded receiving opening on the oil pan 12. Gasket 31 between the base 24 and the pan 12 maintains the connection fluid tight. The base 24 further is composed of three elements including a central electrical terminal 32, an annular insulating member 34 around the terminal 32, and an annular outer mounting member 36 around the insulator 34. O-rings 37 and 38 are confined between the terminal 32 and insulator 34, and the regulator and mounting member 36 respectively; and the components are fixed together as the unitary base by staking overlapping portions on one another as at 39 and 40. The cover 26 is received within an annular groove 41 in the base 24 and secured thereto by means of the lip 42 being staked over against the cover. The terminal 32 has a threaded opening 43 therein which can be used for an external connection as will be apparent.

A reed switch 44 extends within the cavity 29 between the terminal 32 and the closed end 28 of the cover 26. An annular float 46 is disposed over the reed switch 44 within the cover 26 and is movable axially within the cavity 29 relative to the cover and switch. The float 46, as shown, is hollow having inner and outer side walls connected and sealed in an appropriate manner by planar walls at the opposite ends. An annular magnet 50 is fixed within the float 46 and is thus disposed annularly of the reed switch 44. The magnet 50 is of ceramic material, and is polarized on its opposing faces. Thus the lines of flux travel in a circular direction around any magnet cross-section and are concentrated at the center axis generally along the axis of the reed switch 44.

The reed switch 44 includes a glass outer case or enclosure 52 having secured and sealed at its opposite opposing ends a pair of magnetizable reed elements 54 and 56. The ends of the reeds 54 and 56 are soldered to the terminal 32 and to the closed end 28 of the tube 26. The reeds 54 and 56 overlap slightly within the case as at 58 to form the contacts of the switch. The switch operates upon the cantilever deflection of the longer reed 54 to close the overlapping contacts 58. The case 52 is evacuated or charged with an inert gas so that arching or wear of the contacts 58 is at a minimum. The reed switch itself is a known component, so that by itself it forms no part of the subject invention.

The tube 26 has an opening 60 in the side wall extending almost the length of the cavity 29. The opening or slot 60 thereby provides communication between the cavity 29 in which the float 46 is positioned and the exterior of the device within the oil pan 12. A fine filter 62 secured to a C-shaped clamp or plate 64 is positioned over the upper end of the tube 26 to the base 24 to cover the opening 60. The clamp has an opening 66 the size of the opening 60 of the tube so that the openings when aligned provide communication to the cavity 29.

The filter 62 prevents any impurities in the fluid, particularly impurities that are magnetic, from clogging or causing malfunctioning of the magnet 50 in its cooperation with the reed switch 44. The filter 62 further prevents rapid transfer of liquid to and from the cavity 29 so that with splashing or surging of the liquid in the oil pan the float 46 is not caused to oscillate wildly within the cavity. This dampening effect has particular utility when the device is used in a vehicle subjected to vibration and movement, such as in an automotive engine. By rotating the clamp 64 and filter 62 slightly on the tube 26, the overlap of the openings 60 and 66 can be varied (FIG. 4) to adjust the effective area of communicating passage to the cavity 29. This adjustment compensates for the particular viscosity of the liquid measured or its expected turbulence.

The magnet 50 when positioned generally adjacent the contacts 58 induces in the magnetic reeds 54 and 56 a sufficient magnetic attraction to one another to overcome the resiliency of the reed 54 to deflect it and close the contacts. This completes a circuit across the contacts 58 and through the respective reeds 54 and 56. The opening and closing of the contacts occur with a snapping action, since the magnetic force between the spaced contacts rapidly increases as the gap or distance between the contacts decreases upon closing the contacts, and vice versa upon opening the contacts. The tube 26, float 46, filter 62 and clamp 64 are fabricated of nonmagnetizable material, so as to permit unhampered cooperation of the magnet 50 and the reed switch 44.

In operation, the device 16 is positioned in the oil pan 12 in a generally vertical position at a height relative to the oil level 14 at which the magnet 50 while supported in the float 46 is proximate the contacts 58. Thus, for example in FIG. 2, the float 46 is shown buoyed at a position so that the magnet 50 is above the contacts and the contacts are in the open position. However, a slight downward movement of the float 46 and magnet 50 relative to the contacts 58 causes the contacts to close. By an appropriate control such as shown schematically in FIG. 1 this action is utilized to actuate the indicating means 18.

It will be noted that the end 28 of the tube 26 is provided with a plurality of protrusions 68 into the cavity 29. These protrusions act to prevent the float 46 when buoyed against the end 28 from establishing surface contact with the end 28. This permits easy withdrawal movement of the float from the end and avoids the possible establishment of a vacuum between the abutting surfaces.

While only a single embodiment of this invention has been shown, it will be understood that variations can be made therein without departing from its inventive concept. Accordingly, it is desired that the invention be limited only by the scope of the claim hereinafter following.

What is claimed is:

1. A liquid level indicating device for use with a vessel confining a liquid, comprising in combination a metal base having a screw thread thereon for facile connection to said vessel, a metal cover connected to the base and defining within the confines of the cover and base a generally elongated cavity, a reed switch supported within the cavity and extending axially thereof, said reed switch including a sealed enclosure and a pair of elongated slender reeds having ends disposed inside and outside of the sealed enclosure, a terminal carried by said base and insulated therefrom, the external ends of the reeds being connected, respectively, to said cover and terminal for extending respective electrical connections, the internal ends of said reeds overlapping one another slightly to provide switch contacts, a float encircling said switch inside said cover and buoyed by the liquid within the cavity for axial movement in said cavity relative to said switch, an annular magnet supported by the float, said magnet being magnetized with the lines of flux disposed axially of the longitudinal center axis of the magnet and in line generally with the axis of the reed switch, said reeds being fabricated of magnetizable material and said cover and float being fabricated of nonmagnetizable material so that at various positions of the float determined by the level of liquid in the cavity the proximity of the magnet to the contacts actuates the reeds to open and close the switch contacts, said cover having therein at least one opening extending from proximate the opposite ends of the cavity operable to communicate the liquid within the vessel to and from the cavity, and an adjustably positioned nonmagnetizable filter extending over said one opening in said cover for selectively damping any flow of liquid through the opening.

2. A liquid level indicating device for use with a vessel carrying a liquid, comprising in combination a metal base having means thereon for facile connection to said vessel, a cylindrical metal cover carried by said base and having a closed metal end to define an elongated cavity in said vessel, an electrical connector insulated from and carried by said base, a magnetizable reed switch having terminal elements extending axially within the cavity with opposite terminal elements of said switch respectively secured to said closed end and said connector for extending respective electrical connections to said switch, an annular float within said cover encircling said reed switch and buoyed by liquid within said cavity for movement axially of the switch, a magnet carried by said float adjacent said reed switch for actuating said switch in one direction dependent on the position of said float relative to said switch, said cover having an opening therein for passing liquid between said vessel and said cavity in accordance with the level of a liquid in said vessel, a filter element carried by said cover over said opening to dampen the movement of liquid through said opening, and means depending from said closed end for engaging said float to maintain an air pocket between said closed end and float in the event said float is raised to a predetermined position.

References Cited by the Examiner

UNITED STATES PATENTS

| | | | |
|---|---|---|---|
| 258,775 | 5/1892 | Leavitt | 251—345 X |
| 1,133,013 | 3/1915 | Eberhart | 73—313 |
| 1,401,097 | 12/1921 | Nickolaus | 251—343 X |
| 1,735,023 | 11/1929 | Titcomb | 73—313 X |
| 2,586,449 | 2/1952 | Whitten | 73—308 X |
| 2,892,051 | 6/1959 | Moore | 200—81.9 |
| 2,927,176 | 3/1960 | Auld et al. | 73—290.1 |
| 3,044,296 | 7/1962 | Boddy | 73—313 X |
| 3,080,753 | 3/1963 | Tickner et al. | 73—306 |
| 3,148,254 | 9/1964 | Clason | 200—81.9 |
| 3,148,713 | 9/1964 | Jones | 200—87.3 X |
| 3,155,792 | 11/1964 | Werts | 200—87.3 |

LEONARD FORMAN, *Primary Examiner.*

ISAAC LISANN, H. N. HAROIAN, *Assistant Examiners.*